US011431552B1

(12) United States Patent
Ganapathi et al.

(10) Patent No.: US 11,431,552 B1
(45) Date of Patent: Aug. 30, 2022

(54) ZERO TRAFFIC LOSS IN VLT FABRIC

(71) Applicant: Dell Products L.P., Round Rock, TX (US)

(72) Inventors: Ramesh Ganapathi, Chennai (IN);
Charles C. Park, San Jose, CA (US);
Gopinath Jayapal, Tamilnadu (IN);
Gokulnath Raja, Chennai (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/241,740

(22) Filed: Apr. 27, 2021

(51) Int. Cl.
*H04L 12/26* (2006.01)
*H04L 41/0654* (2022.01)

(52) U.S. Cl.
CPC ............................... *H04L 41/0654* (2013.01)

(58) Field of Classification Search
CPC .................................................. H04L 41/0654
See application file for complete search history.

(56) References Cited

U.S. PATENT DOCUMENTS

| 2015/0188808 A1* | 7/2015 | Ghanwani | H04L 41/0663 |
| | | | 709/244 |
| 2015/0312088 A1* | 10/2015 | Ramakrishnan | H04L 45/28 |
| | | | 370/218 |
| 2019/0132240 A1* | 5/2019 | Natarajan | H04L 49/354 |
| 2020/0099573 A1* | 3/2020 | Subbiah | H04L 67/1097 |
| 2020/0119974 A1* | 4/2020 | Subramani | H04L 45/48 |
| 2021/0126856 A1* | 4/2021 | Muthukaruppan | H04L 45/245 |
| 2021/0218628 A1* | 7/2021 | Kaliyamoorthy | H04L 41/0681 |
| 2021/0281441 A1* | 9/2021 | Jayakumar | H04L 45/245 |
| 2021/0281526 A1* | 9/2021 | Angamuthu | H04L 49/3009 |
| 2022/0014481 A1* | 1/2022 | Rajagopalan | H04L 45/66 |

FOREIGN PATENT DOCUMENTS

WO WO-0016114 A1 * 3/2000 ............. H04J 3/14

* cited by examiner

*Primary Examiner* — Richard G Keehn
(74) *Attorney, Agent, or Firm* — Jackson Walker L.L.P.

(57) ABSTRACT

An information handling system may include at least one processor; and a memory; wherein the information handling system is configured to manage a network that includes a first virtual link trunking (VLT) node, a second VLT node, and a plurality of devices that are communicatively coupled to the first VLT node via a first set of links and to the second VLT node via a second set of links, wherein the managing includes: detecting that the first VLT node has malfunctioned; detecting that the first VLT node has recovered; and after the first VLT node has recovered, preventing traffic over the first set of links until determining that all information needed to forward the traffic has been synced between the first VLT node and the second VLT node.

18 Claims, 2 Drawing Sheets

ZERO TRAFFIC LOSS IN VLT FABRIC

TECHNICAL FIELD

The present disclosure relates in general to information handling systems, and more particularly to management of communications links in clusters of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), issues can arise in the management of communications links among different nodes. For example, in an HCI multi-rack deployment with a Layer 2 fabric, virtual link trunking (VLT) is sometimes used. In a VLT environment, the HCI nodes may be connected to downstream VLT nodes' orphan ports to achieve redundancy and resiliency.

However, existing solutions may cause traffic loss when an inter-chassis link goes down or one of the VLT nodes reboots. It would be desirable to implement a solution which addresses this issue as well as others.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with the management of communications links in clusters of information handling systems may be reduced or eliminated.

In accordance with embodiments of the present disclosure, an information handling system may include at least one processor; and a memory; wherein the information handling system is configured to manage a network that includes a first virtual link trunking (VLT) node, a second VLT node, and a plurality of devices that are communicatively coupled to the first VLT node via a first set of links and to the second VLT node via a second set of links, wherein the managing includes: detecting that the first VLT node has malfunctioned; detecting that the first VLT node has recovered; and after the first VLT node has recovered, preventing traffic over the first set of links until determining that all information needed to forward the traffic has been synced between the first VLT node and the second VLT node.

In accordance with these and other embodiments of the present disclosure, a method may include communicatively coupling an information handling system to a network that includes a first virtual link trunking (VLT) node, a second VLT node, and a plurality of devices that are communicatively coupled to the first VLT node via a first set of links and to the second VLT node via a second set of links; and managing the network by the information handling system, wherein the managing includes: detecting that the first VLT node has malfunctioned; detecting that the first VLT node has recovered; and after the first VLT node has recovered, preventing traffic over the first set of links until determining that all information needed to forward the traffic has been synced between the first VLT node and the second VLT node.

In accordance with these and other embodiments of the present disclosure, an article of manufacture may include a non-transitory, computer-readable medium having computer-executable instructions thereon that are executable by a processor of an information handling system for: managing a network that includes a first virtual link trunking (VLT) node, a second VLT node, and a plurality of devices that are communicatively coupled to the first VLT node via a first set of links and to the second VLT node via a second set of links, wherein the managing includes: detecting that the first VLT node has malfunctioned; detecting that the first VLT node has recovered; and after the first VLT node has recovered, preventing traffic over the first set of links until determining that all information needed to forward the traffic has been synced between the first VLT node and the second VLT node.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
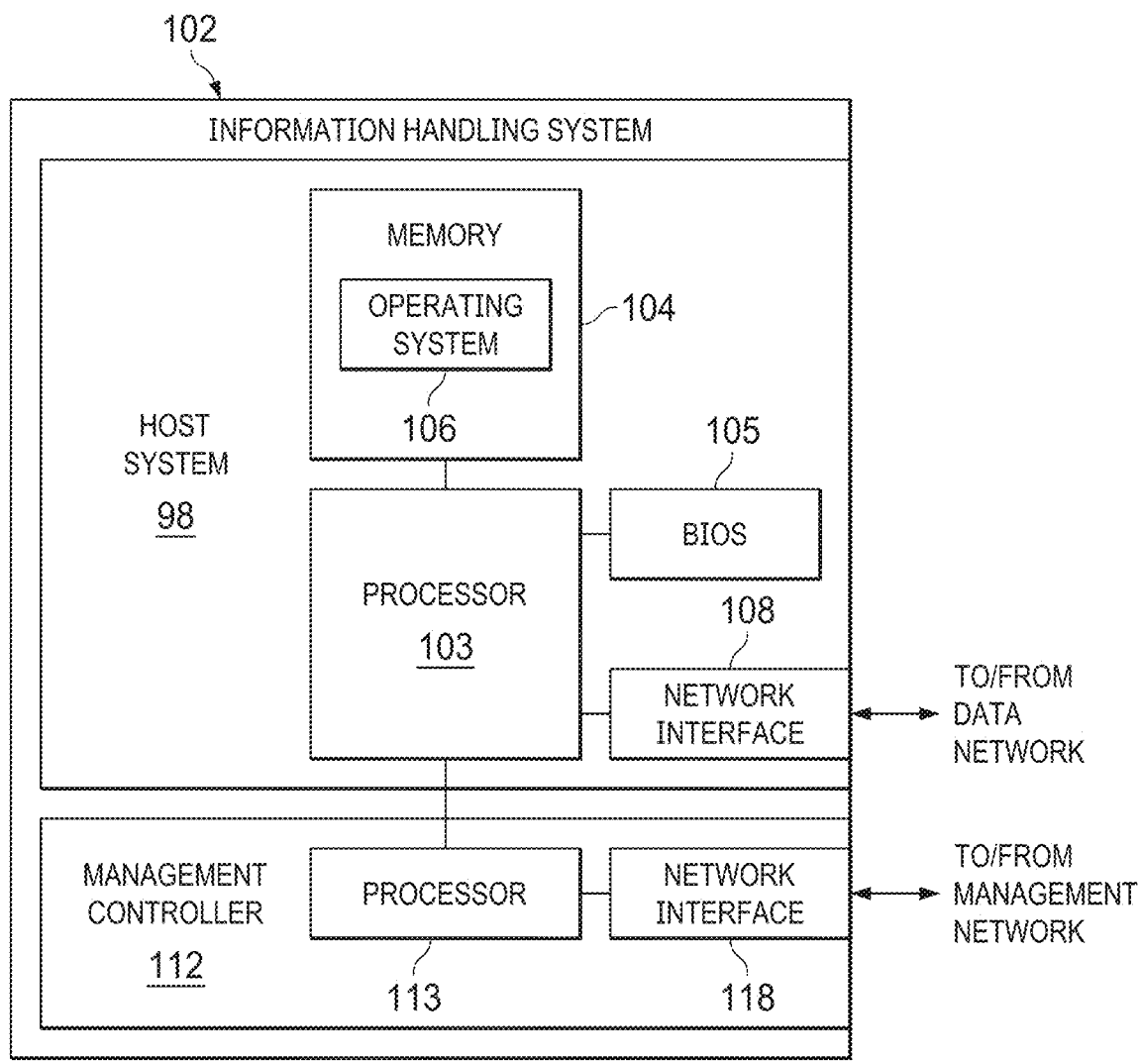
FIG. 1 illustrates a block diagram of an example information handling system, in accordance with embodiments of the present disclosure.
Figure 2:
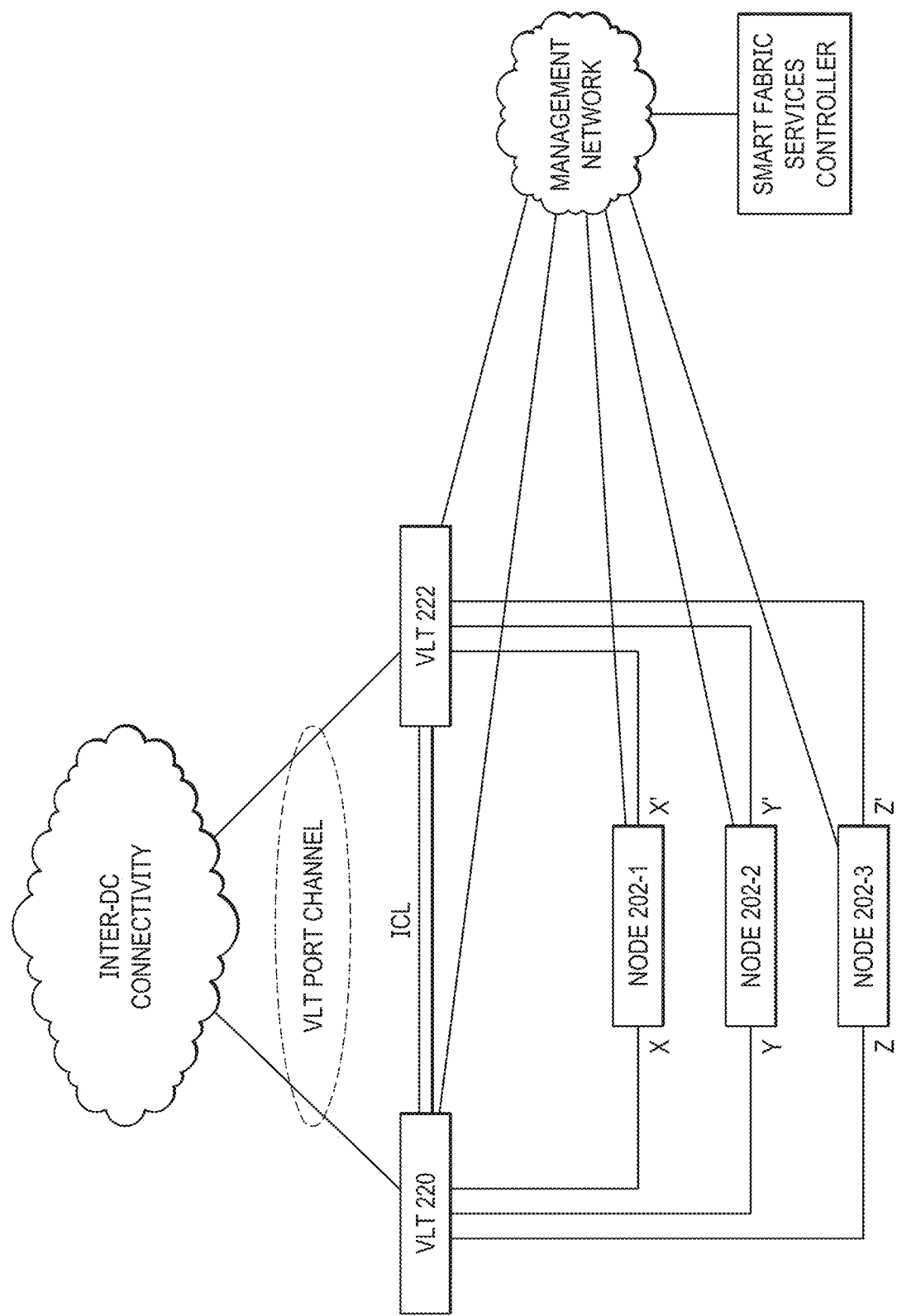
FIG. 2 illustrates a block diagram of an example cluster architecture, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Turning now to FIG. 2, an example cluster architecture is shown. Nodes 202-1, 202-2, and 202-3 (collectively, nodes 202) may be HCI nodes in some embodiments. Nodes 202-1, 202-2, and 202-3 may respectively be connected to VLT nodes 220 and 222 through individual links X, X', Y, Y', Z and Z' as shown. VLT nodes 220 and 222 may comprise information handling systems such as routers or any other suitable type of apparatus. Nodes 202 may generally communicate via either VLT 220 or 222, although typically one VLT node will be designated as primary and the other as secondary. In this example, the interfaces X, X', Y, Y', Z and Z' between nodes 202 and the VLT fabric are termed "orphan ports."

Additionally, VLT 220 and VLT 222 are connected to one another via ICL (inter-chassis link), as well as to an inter-DC network connectivity link via an uplink VLT port channel, which may be coupled to one or more other data centers. Nodes 202 and VLT 220 and 222 may also be coupled to a management network, which may allow access to a Smart Fabric Services (SFS) controller as well as any other suitable components.

Consider the situation of VLT 220 malfunctioning and then recovering, or the situation of the ICL port between VLT nodes 220 and 222 going down and then coming back up. In this scenarios, the orphan ports are operationally up immediately after the node is up (or the ICL link is up), and traffic will start flowing.

In particular, if nodes 202 need to send or receive traffic to or from the inter-DC network without any loss, nodes 202 will expect that the information required to forward traffic such as routes, ARPs, and MACs will be installed in both the VLT nodes 220 and 222 as soon as the orphan ports are operationally up.

However, in the case of scaled routes and MACs, the routing protocol convergence and syncing may take a considerable amount of time, during which any traffic from/to nodes 202 will be lost until the routes and MACs are programmed.

Accordingly, as discussed in further detail below, embodiments of this disclosure may detect the connected ports of nodes 202 using Smart Fabric Services (SFS) and in a failure scenario, enable these ports automatically only when appropriate, allowing for zero traffic loss.

Nodes 202 may be detected by the SFS controller via REST or any other suitable method. The SFS controller may include a data structure such as a database, which may comprise routing information including the details of the connected ports from nodes 202 to the pair of VLT nodes 220 and 222. The SFS controller may, upon detecting that one of the VLT nodes is down or that the ICL port is down, apply the following steps to achieve zero traffic loss.

1. Wait for the VLT fabric to come up (e.g., delay restore timer).
2. Poll the secondary VLT node to check if routes, ARPs, and MACs are in sync with the primary VLT node.
3. Prevent the connected orphan ports from nodes 202 from becoming operational until the routing protocol has converged, and the routes, ARPs, and MACs are synced and programmed in both VLT nodes.
4. The connected orphan ports from nodes 202 may in some embodiments be made operationally up before the uplink VLT port channel.

Further, in some embodiments the traffic from nodes 202 may be routed via ICL for a transient period of time until the uplink VLT port channel is up.

The discussion above describes generally what may occur when a VLT node malfunctions or the ICL link goes down. However, these two situations may involve some distinctions relative to one another, and so they are discussed separately below as well.

In the situation where VLT 220 (which may be the secondary VLT node in this example) goes down, then links X, Y, and Z fail and all traffic from nodes 202 flows via links X', Y', and Z'. When VLT 220 comes back up, links X, Y, and Z (as well as the uplink VLT port channel from VLT 220) will not come up until VLT 220 re-syncs with VLT 222, receiving routing information via the ICL link. The SFS controller oversees this process, ensuring that the VLT nodes are synced before the links mentioned above are re-enabled. Once the syncing is complete, the SFS controller may open the ports for links X, Y, and Z, as well as the uplink VLT port channel. (In the absence of the SFS controller's oversight, nodes 202 could potentially try to send traffic to VLT 220 because links X, Y, and Z appear to be physically enabled. That traffic would be lost, however.)

Alternatively, consider the situation in which the ICL link between VLT 220 and VLT 222 goes down. This failure may be detected by the SFS controller via LLDP or any other suitable mechanism. The network is then partitioned, and both VLT 220 and 222 may attempt to act as the primary VLT node and manage nodes 202. Traffic still flows in this scenario, albeit without redundancy. When the ICL link comes back up, routing data is synchronized between VLT 220 and 222, and redundancy is restored.

Thus in either failure scenario, the techniques disclosed herein may prevent traffic from being lost.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to manage a network that includes a first virtual link trunking (VLT) node, a second VLT node, and a plurality of devices that are communicatively coupled to the first VLT node via a first set of links and to the second VLT node via a second set of links, wherein the managing includes:
   detecting that the first VLT node has malfunctioned;
   detecting that the first VLT node has recovered; and
   after the first VLT node has recovered, preventing traffic over the first set of links until determining that all information needed to forward the traffic has been synced between the first VLT node and the second VLT node.

2. The information handling system of claim 1, wherein the devices are nodes of a hyper-converged infrastructure (HCI) cluster.

3. The information handling system of claim 1, wherein the first VLT node is communicatively coupled to the second VLT node via an inter-chassis link (ICL).

4. The information handling system of claim 1, wherein preventing traffic over the first set of links comprises disabling ports of the plurality of devices that are coupled to the first set of links.

5. The information handling system of claim 1, wherein the information handling system is a smart fabric services (SFS) controller.

6. The information handling system of claim 5, wherein the SFS controller is communicatively coupled to the first and second VLT nodes and to the plurality of devices via an out-of-band management network.

7. A method comprising:
   communicatively coupling an information handling system to a network that includes a first virtual link trunking (VLT) node, a second VLT node, and a plurality of devices that are communicatively coupled to the first VLT node via a first set of links and to the second VLT node via a second set of links; and
   managing the network by the information handling system, wherein the managing includes:
   detecting that the first VLT node has malfunctioned;
   detecting that the first VLT node has recovered; and
   after the first VLT node has recovered, preventing traffic over the first set of links until determining that all information needed to forward the traffic has been synced between the first VLT node and the second VLT node.

8. The method of claim 7, wherein the devices are nodes of a hyper-converged infrastructure (HCI) cluster.

9. The method of claim 7, wherein the first VLT node is communicatively coupled to the second VLT node via an inter-chassis link (ICL).

10. The method of claim 7, wherein preventing traffic over the first set of links comprises disabling ports of the plurality of devices that are coupled to the first set of links.

11. The method of claim 7, wherein the information handling system is a smart fabric services (SFS) controller.

12. The method of claim 11, wherein the SFS controller is communicatively coupled to the first and second VLT nodes and to the plurality of devices via an out-of-band management network.

13. An article of manufacture comprising a non-transitory, computer-readable medium having computer-executable instructions thereon that are executable by a processor of an information handling system for:
   managing a network that includes a first virtual link trunking (VLT) node, a second VLT node, and a plurality of devices that are communicatively coupled to the first VLT node via a first set of links and to the second VLT node via a second set of links, wherein the managing includes:
   detecting that the first VLT node has malfunctioned;
   detecting that the first VLT node has recovered; and
   after the first VLT node has recovered, preventing traffic over the first set of links until determining that all information needed to forward the traffic has been synced between the first VLT node and the second VLT node.

14. The article of claim 13, wherein the devices are nodes of a hyper-converged infrastructure (HCI) cluster.

15. The article of claim 13, wherein the first VLT node is communicatively coupled to the second VLT node via an inter-chassis link (ICL).

16. The article of claim 13, wherein preventing traffic over the first set of links comprises disabling ports of the plurality of devices that are coupled to the first set of links.

17. The article of claim 13, wherein the information handling system is a smart fabric services (SFS) controller.

18. The article of claim 17, wherein the SFS controller is communicatively coupled to the first and second VLT nodes and to the plurality of devices via an out-of-band management network.

* * * * *